Dec. 17, 1957   R. F. JENKINS ET AL   2,816,592
MANUFACTURE OF BELLOWS AND THE LIKE DEVICES
Filed Dec. 10, 1954   15 Sheets-Sheet 3
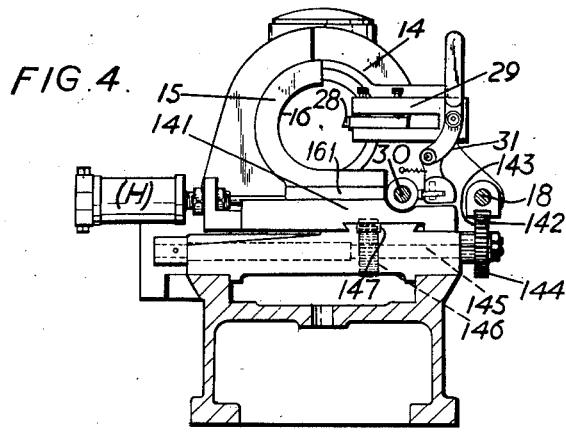
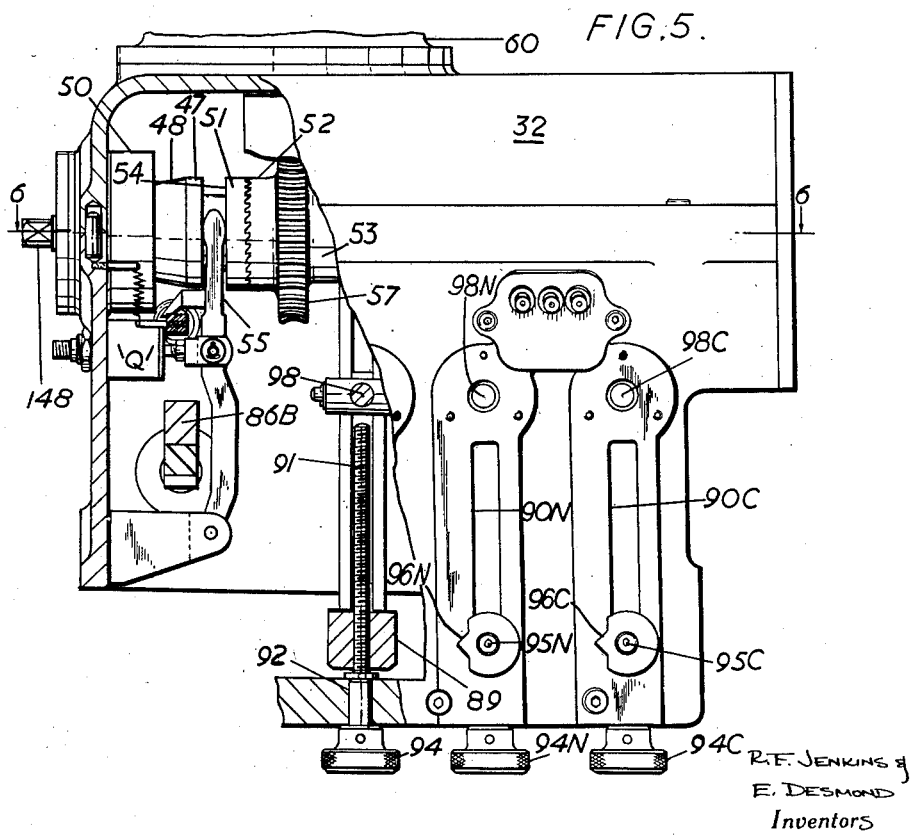

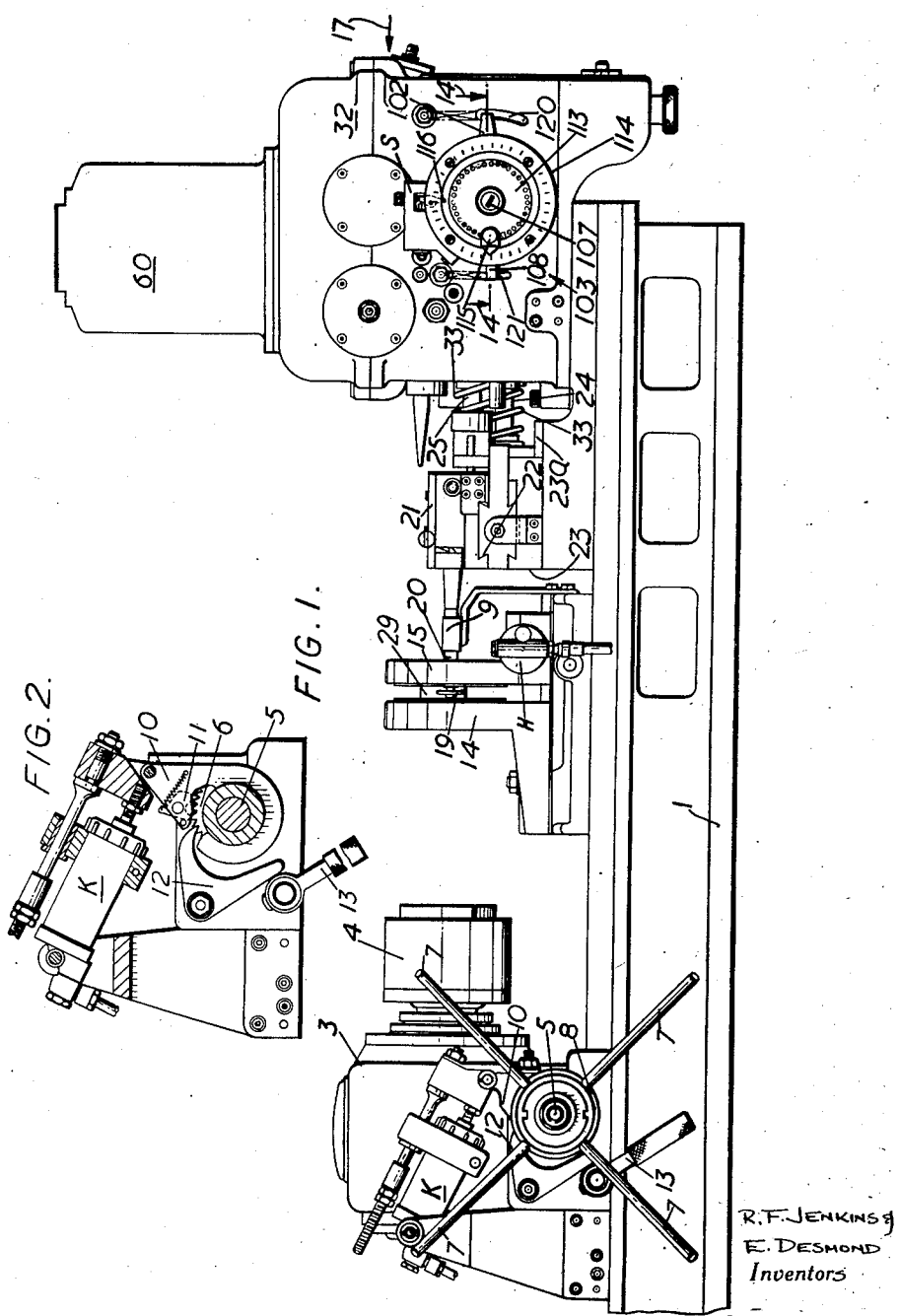

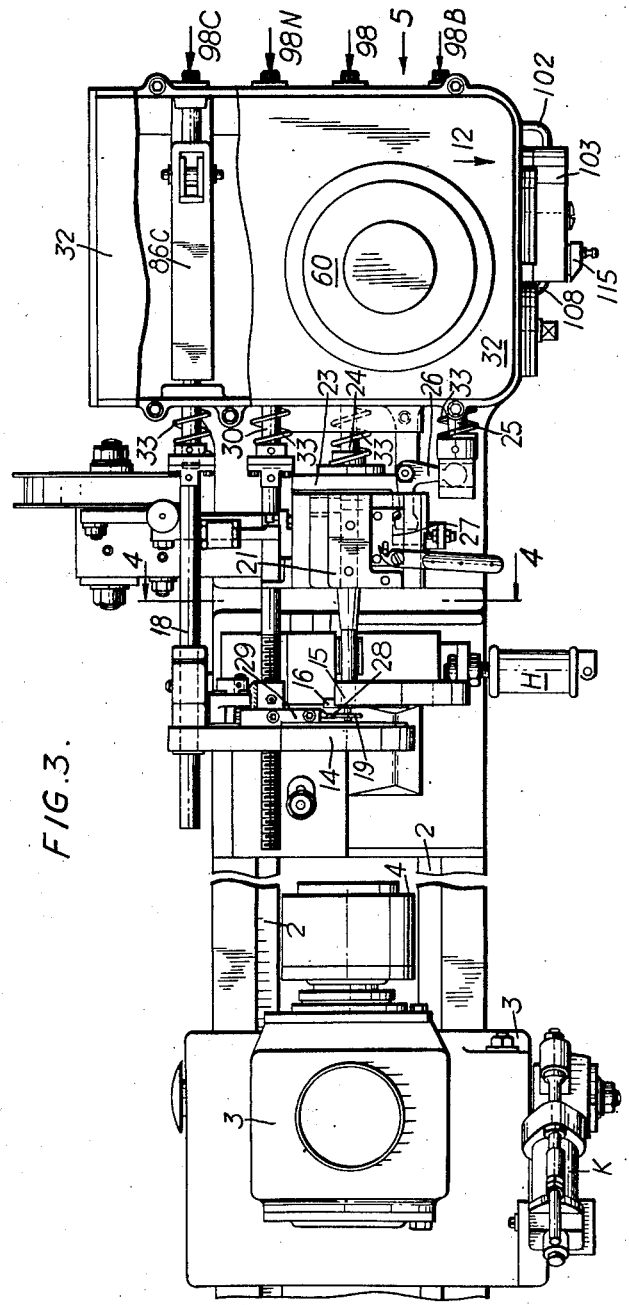

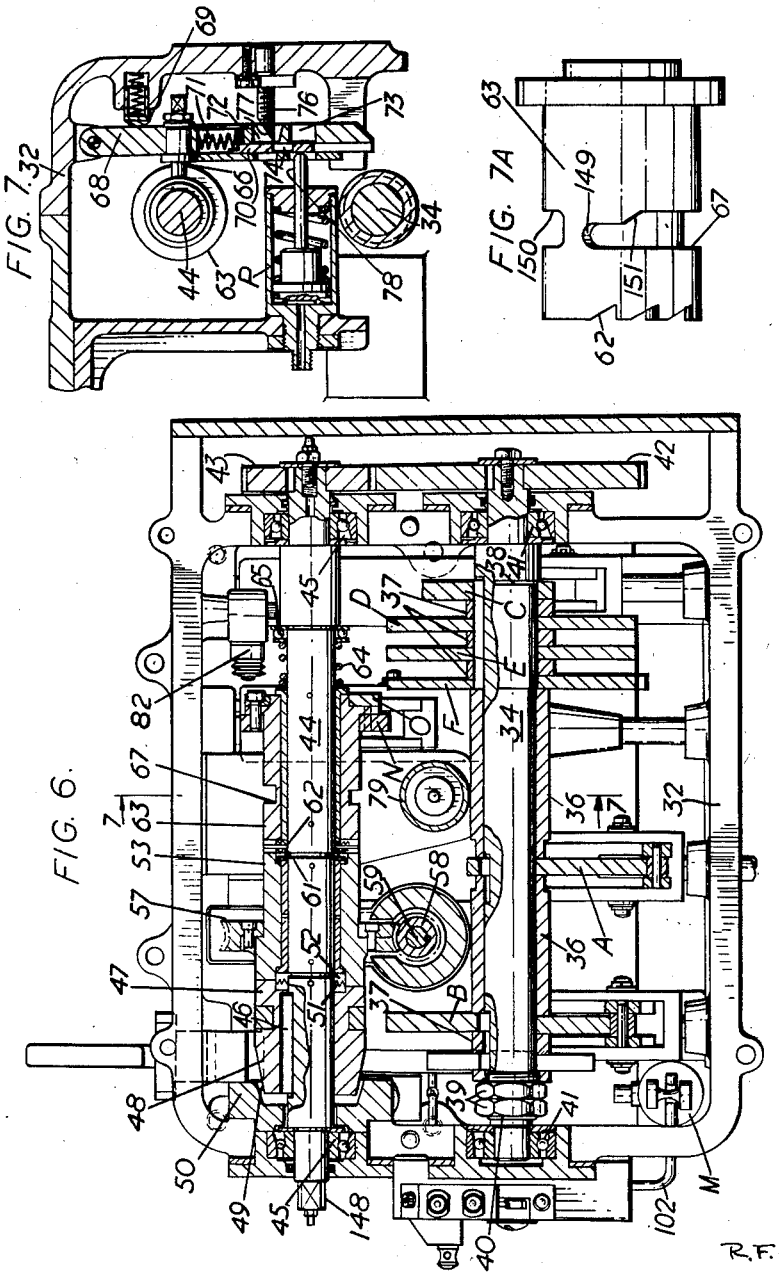

Dec. 17, 1957    R. F. JENKINS ET AL    2,816,592
MANUFACTURE OF BELLOWS AND THE LIKE DEVICES
Filed Dec. 10, 1954    15 Sheets-Sheet 5
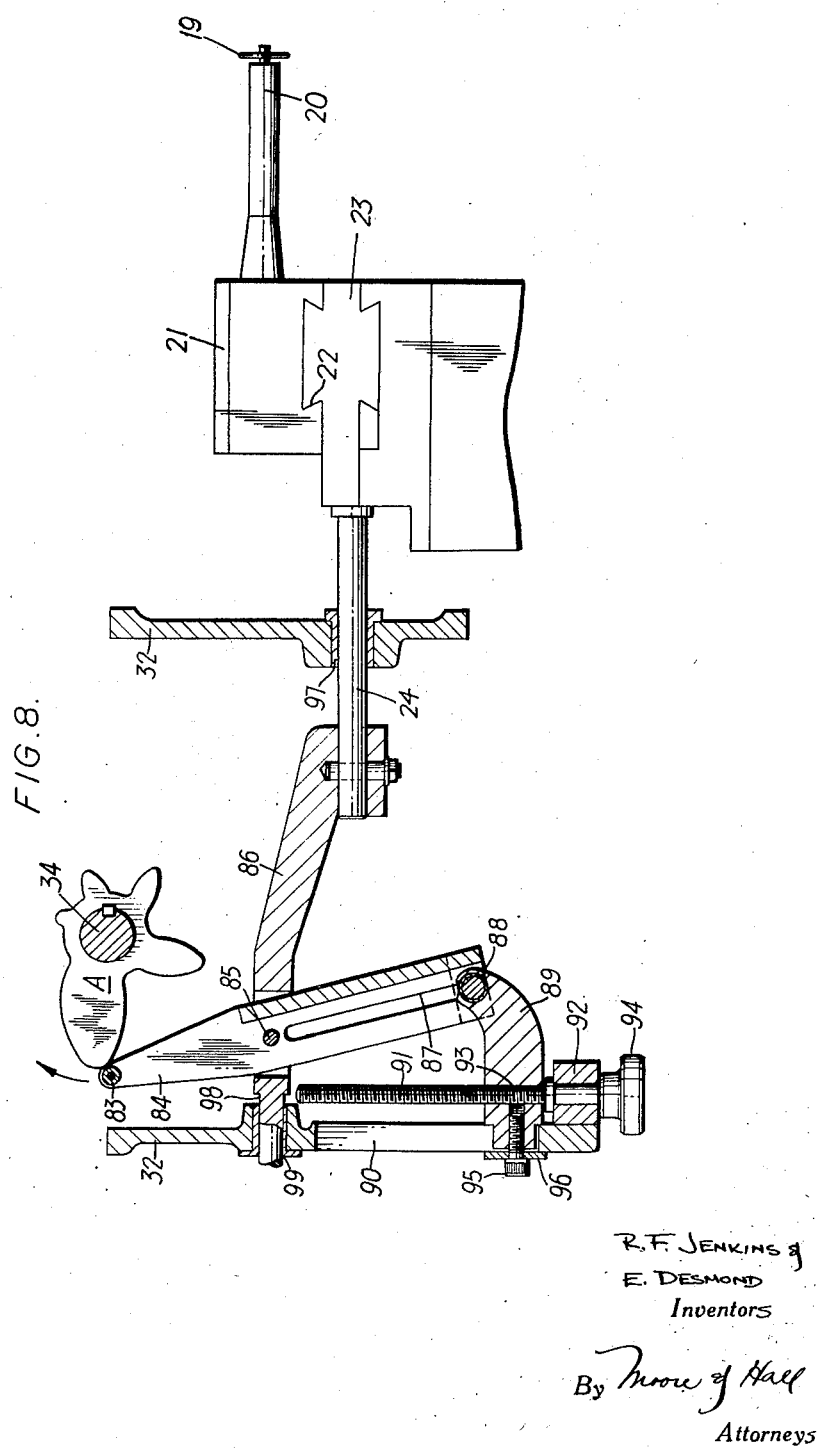

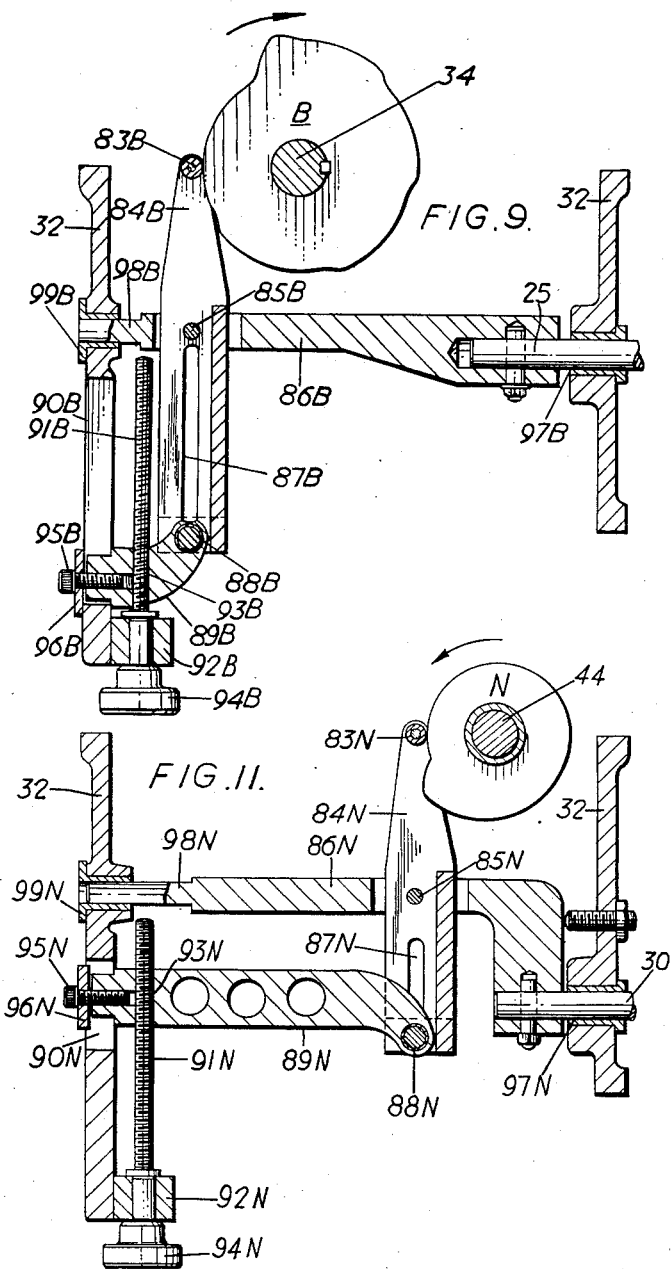

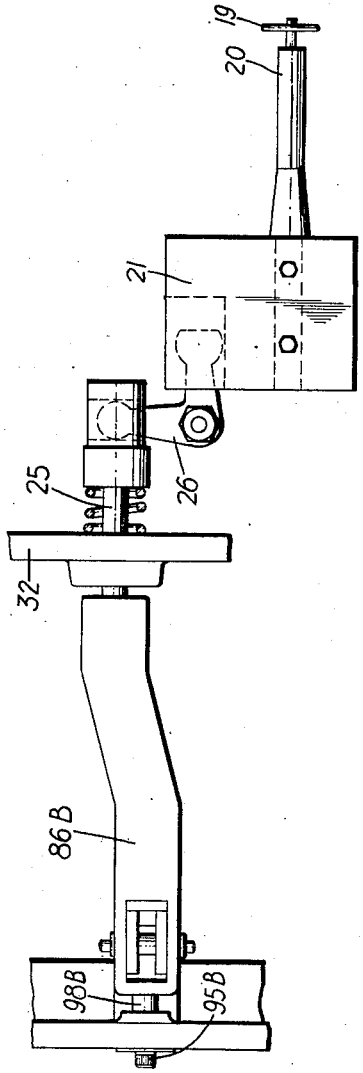

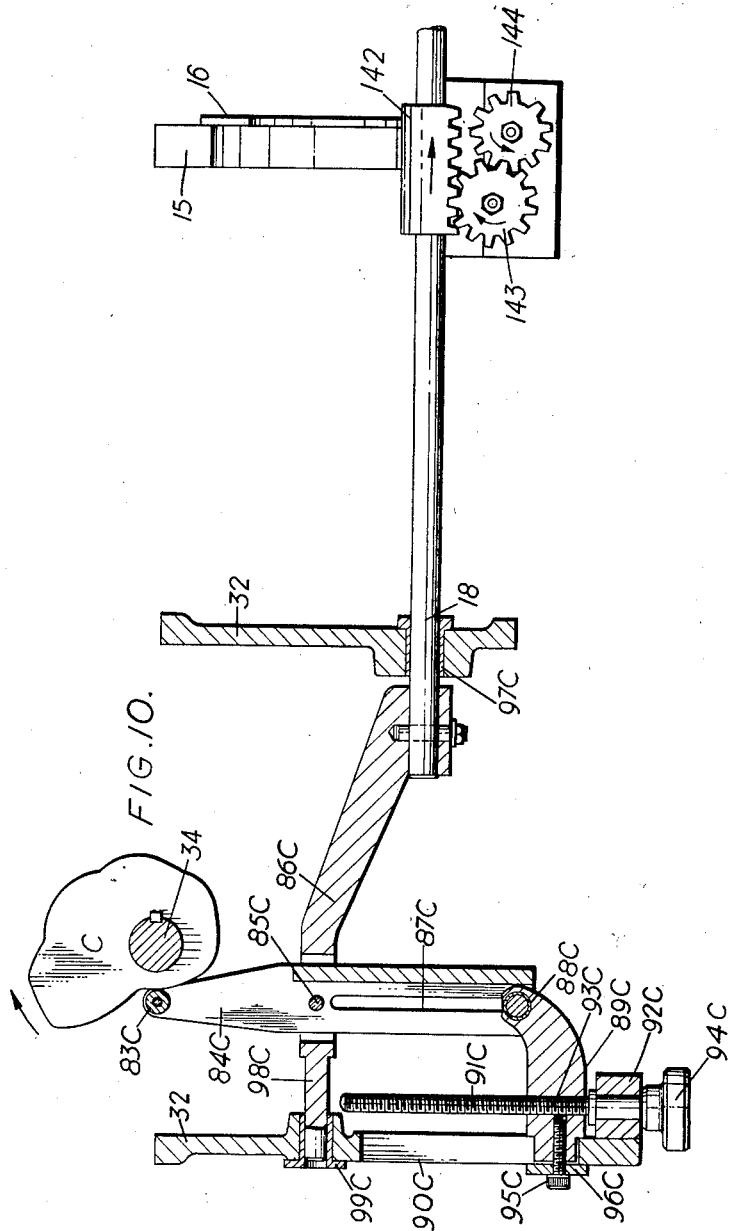

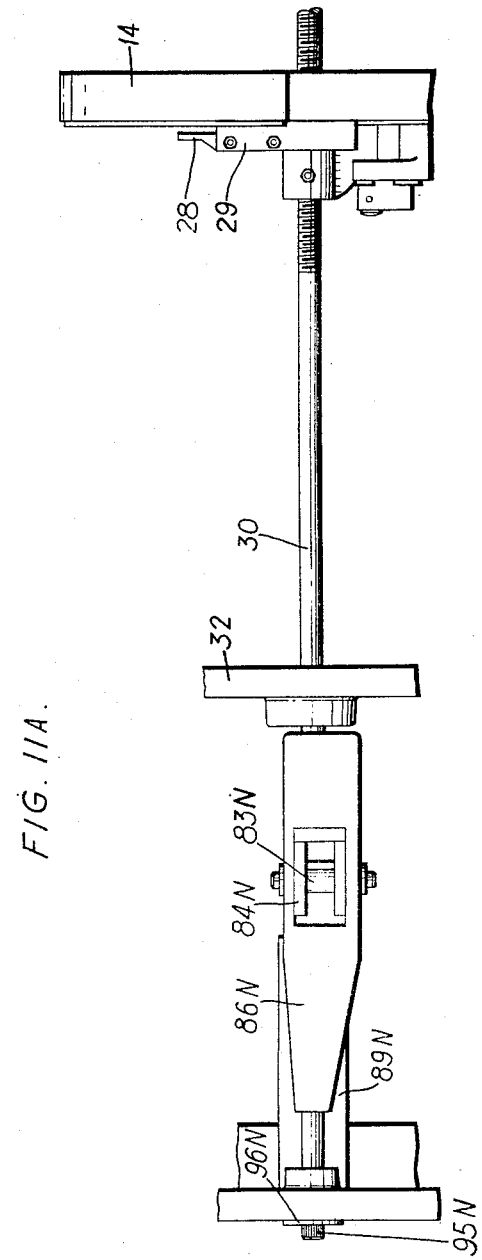

R. F. JENKINS &
E. DESMOND
Inventors

By Moore & Hall
Attorneys

Dec. 17, 1957   R. F. JENKINS ET AL   2,816,592
MANUFACTURE OF BELLOWS AND THE LIKE DEVICES
Filed Dec. 10, 1954   15 Sheets-Sheet 11

R.F. JENKINS &
E. DESMOND
Inventors

By Moore & Hall
Attorneys

Dec. 17, 1957   R. F. JENKINS ET AL   2,816,592
MANUFACTURE OF BELLOWS AND THE LIKE DEVICES
Filed Dec. 10, 1954   15 Sheets-Sheet 13

R. F. JENKINS &
E. DESMOND
Inventors

By Moore & Hall
Attorney

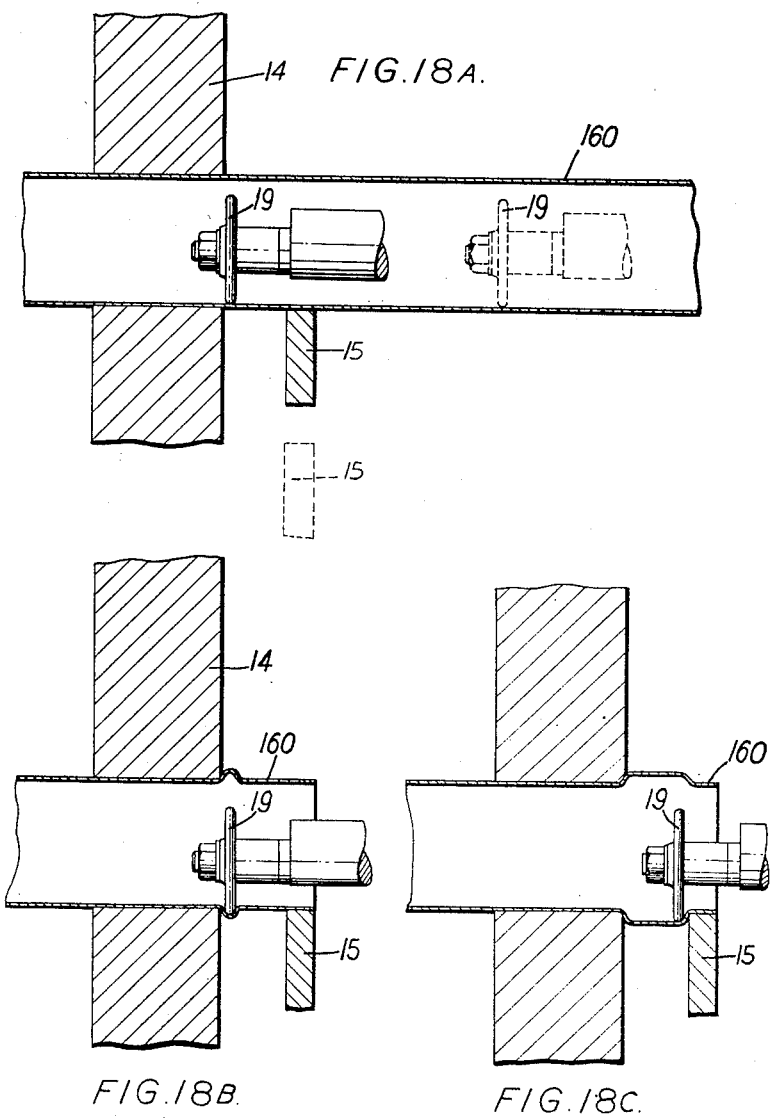

R. F. JENKINS &
E. DESMOND
Inventors

By Moore & Hall
Attorneys

United States Patent Office 2,816,592
Patented Dec. 17, 1957

2,816,592

MANUFACTURE OF BELLOWS AND THE LIKE DEVICES

Rhonald Frank Jenkins, Edgware, and Eric Desmond, Pinner, England, assignors to Smiths America Corporation, Lakeland, Fla.

Application December 10, 1954, Serial No. 474,483

Claims priority, application Great Britain December 10, 1953

17 Claims. (Cl. 153—2)

The present invention relates to the manufacture of devices, such as bellows, of the kind which are symmetrical about an axis and have a plurality of similar separate annular convolutions, in distinction from devices having convolutions which are linked to give a helical or thread-like configuration and it is the object of the present invention to provide a machine for the manufacture of such devices which is capable of forming such a device from tubular material by mechanical means with few manually controlled operations.

According to the present invention a machine for the manufacture of devices of the kind referred to from a tubular blank comprises means to rotate the blank about its axis, external and internal tools adapted to engage with the blank and to be moved relatively to each other and to the blank to form convolutions in the blank, a counter device, means to actuate said counter device upon completion of each convolution, said counter device including a trip member adapted to be displaced after the completion of a predetermined number of convolutions, a part-off tool, and means controlled by the trip member and actuated upon displacement thereof to operate the part-off tool, after a pre-determined number of convolutions has been formed, to sever the device from the tubular blank. Preferably means are provided to stop the rotation of the blank after the separation of the completed device from the blank.

A machine in accordance with the invention and suitable for the manufacture of a metallic bellows from a tubular blank will now be described with reference to the accompanying drawings, of which:

Figure 1 shows a general view of the machine in side elevation

Figure 2 shows a part sectional view of details of certain components appearing in Figure 1

Figure 12:
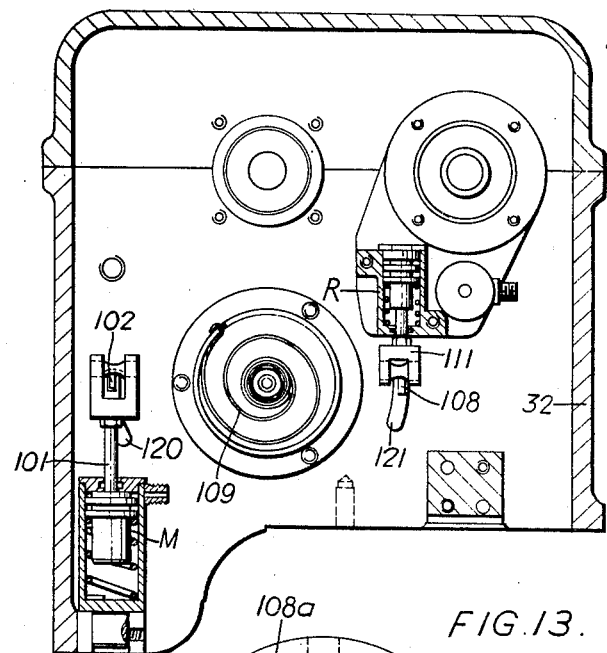

Figure 3 shows a general view of the machine in plan part of cam box 32 together with shafts 34 and 44 are cut away to show some of the components associated with push rod 18.

Figure 4 shows a part sectional view along line 4—4 of Figure 3

Figure 5 shows a part sectional view from the direction of arrow 5 of Figure 3

Figure 6 shows a sectional view along line 6—6 of Figure 5

Figure 7 shows a sectional view along line 7—7 of Figure 6

Figure 7A shows a detailed view of sleeve 63, appearing in Figures 6 and 7

Figure 8 shows a part sectional view in side elevation of the mechanism which produces the longitudinal movement in the internal tool under the control of cam A.

Figures 9 and 9A show a part sectional view in side elevation and a view in plan respectively of the mechanism which produces lateral movement of the internal tool under control of cam B.

Figure 10 shows a part sectional view in side elevation of the mechanism which produces the longitudinal movement of the external tool under the control of cam C.

Figures 11 and 11A show a part sectional view in side elevation and a view in plan respectively of the mechanism which produces lateral movement of the part-off tool under the control of cam N.

Figure 12 shows a view of part of the interior of cam box 32 from the direction of arrow 12 in Figure 3

Figure 13:
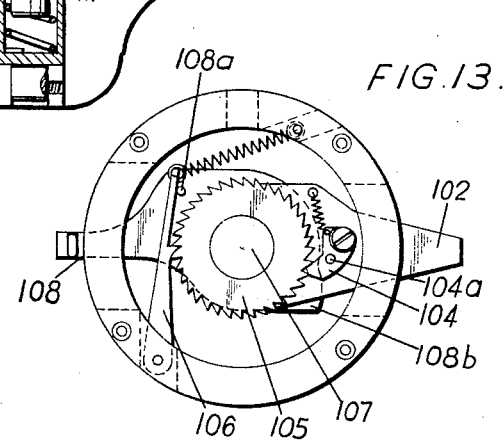

Figure 13 shows a view of details of a counter mechanism indicated generally at 103 in Figure 1

Figure 14:
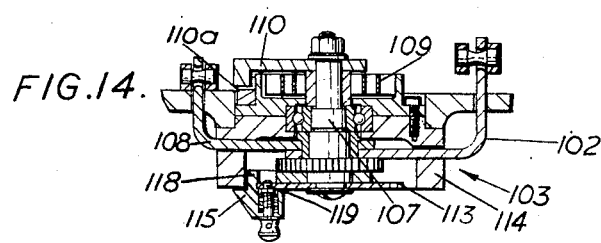

Figure 14 shows a sectional view of mechanism 103 along line 14—14 of Figure 1

Figure 15:
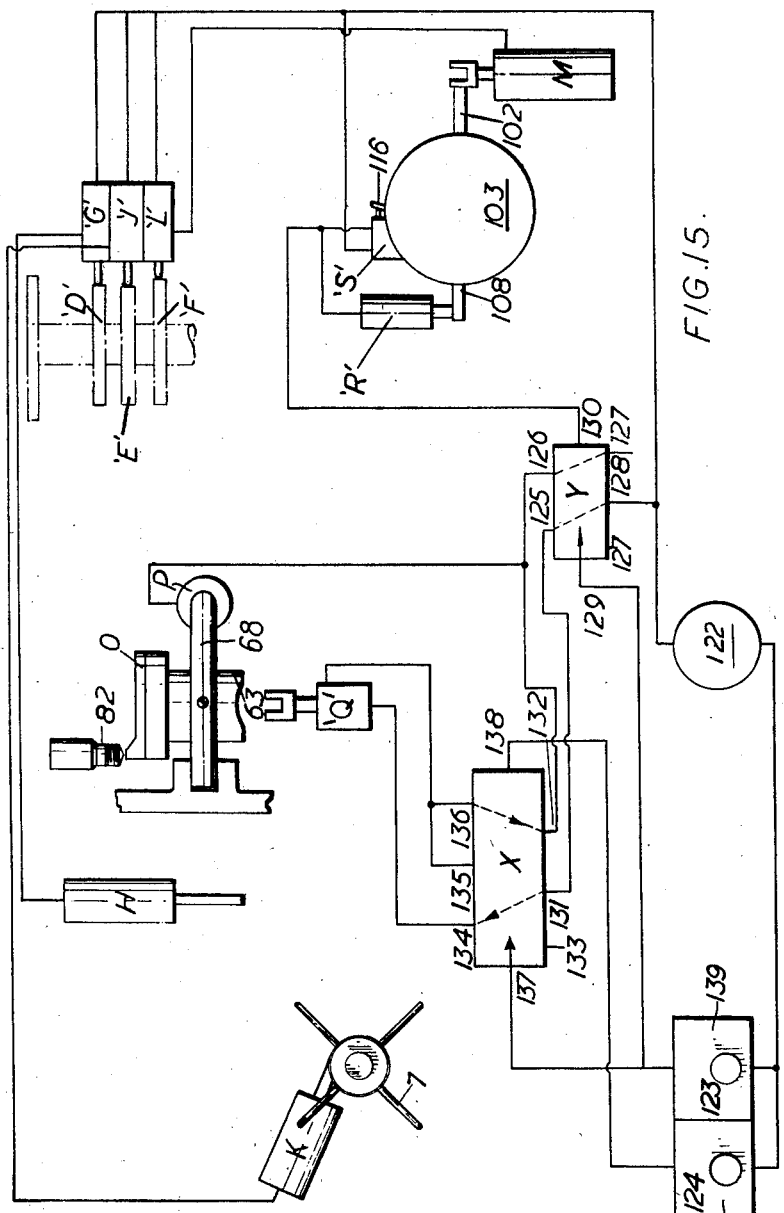

Figure 15 shows schematically the control circuit for the machine

Figure 16:
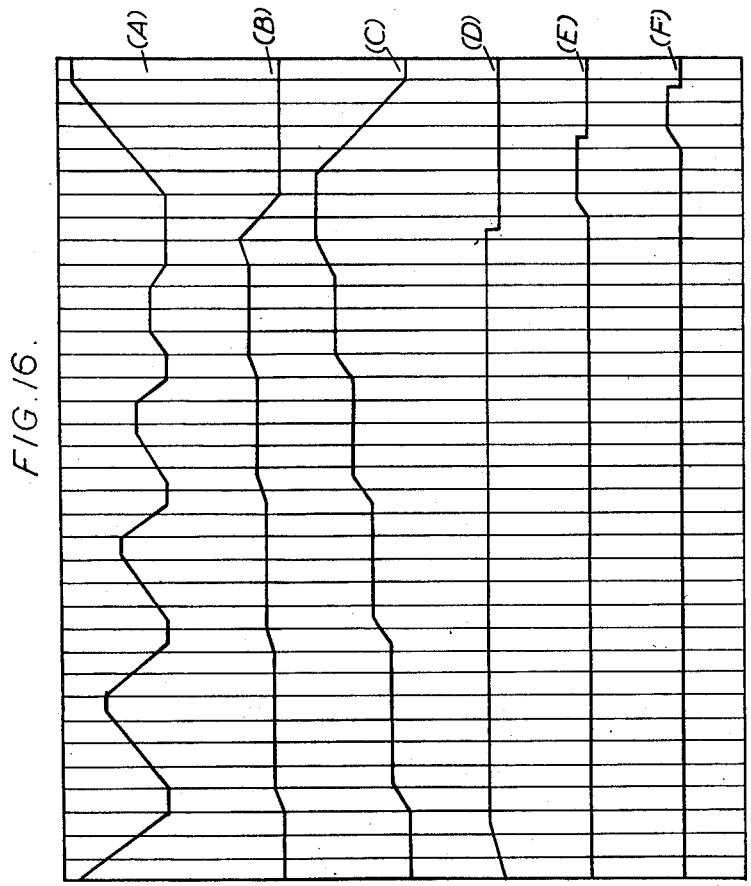

Figure 16 shows the relationship of certain cam profiles to each other

Figure 17:
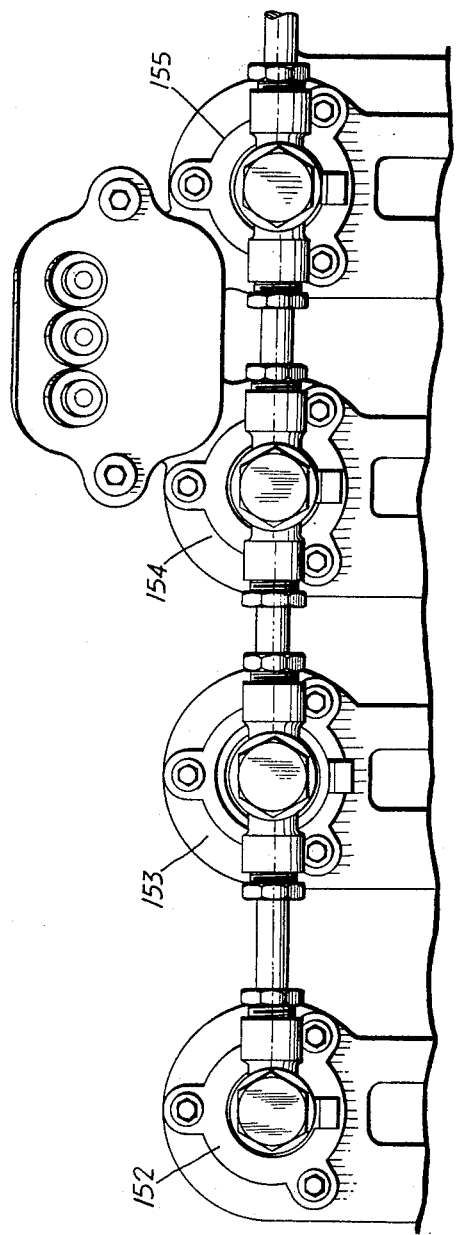

Figure 17 shows a view of a modification from the direction of arrow 17 in Figure 1.

Figures 18A, B, C and D show schematically stages in the formation of a convolution during operation of the machine.

Figure 18D:
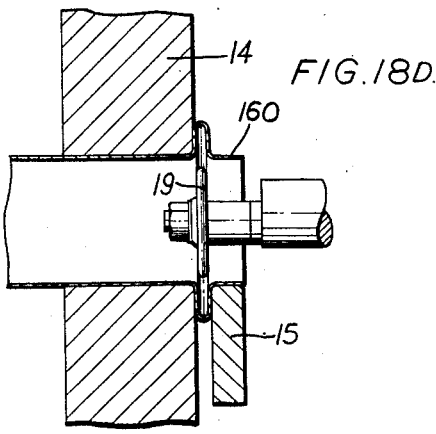
Figure 18E:
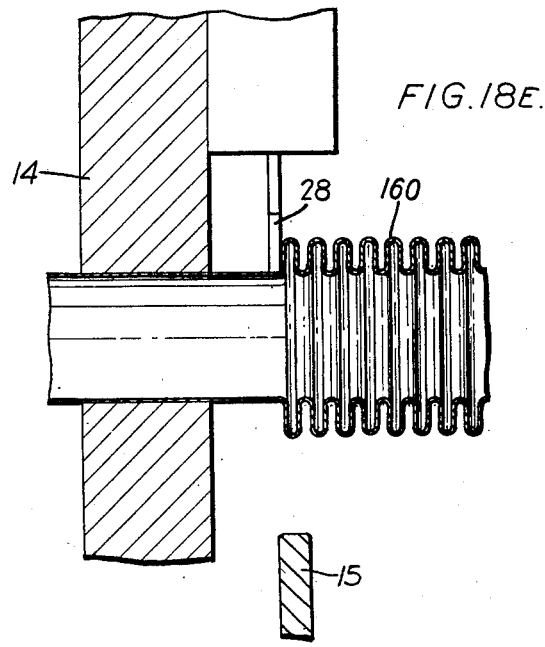

Figure 18E shows schematically the part-off tool in operation.

In the subsequent description references are frequently made to compressed air energised cylinders, and it is to be understood that unless the contrary is stated each cylinder is single acting and provided with a single inlet port and a return spring, so that application of air pressure results in motion of the piston in one sense and release of pressure results in return of the piston under the influence of the return spring.

The machine is mounted upon an elongated base 1 which carries at one end a working head incorporating the various tools which perform the requisite manipulations of the blank, and is formed with slideways 2 which carry a chuck head 3, which in its turn carries a chuck 4 capable of holding the tubular blank. Chuck 4 may be of any convenient form, either manually or pneumatically operated, and will not be further described. It is rotated in operation by a motor controlled by a conventional contactor system. Head 3 is located along the slideways 2 by a conventional rack (attached to the base) and pinion (attached to the head) co-operating therewith. The pinion is rotated through gearing from a shaft 5 which carries a ratchet 6. Shaft 5 may be rotated either manually, by means of four handles 7 attached to a detachable hub 8, or by the action of a compressed-air actuated piston and cylinder K. The piston of 9 is connected to a rotatable arm 10 which carries a spring-loaded pawl 11, capable of engaging with the teeth of ratchet 6. A further pawl 12 also engages with the teeth of ratchet 6, and may be released by handle 13. Thus each time cylinder K is energised the chuck is fed to the right (as shown in Figure 1) by a predetermined amount. The drive to the pinion is adjustable so that the magnitude of the predetermined amount may be set appropriately.

The working head carries, at the end towards the chuck, a fixed steady 14 provided with a hole whose internal diameter is a running fit upon the exterior of the tubular blank. An external tool or sector plate 15 is situated on the side of 14 away from the chuck. This has a working portion 16 whose contour is the arc of a circle corresponding to the external diameter of the blank. Plate 15 is mounted on a transverse slide 161 and positioned in a direction transverse to the base-plate by a compressed air actuated piston and cylinder H. When cylinder H is de-energised plate 15 is held clear of the blank, and energisation of cylinder H positions plate 15 adjacent to the blank. The transverse slide 161 is itself mounted on a longitudinal slide 141, which is positioned longitudinally by a push-rod 18. Push rod 18 carries a rack 142 engaging with a gear 143. Gear 143 engages with a further gear 144 mounted on shaft 145 carrying pinion 146. Pinion 146 engages with rack 147 attached to slide 141 (Figure 4). A C-shaped steady 9 of suitable diameter supports the completed convolutions. An internal tool or spinning roller 19 is rotatably mounted on an arm 20 extending parallel to the common axis of the chuck and steady. Arm 20 is mounted on a carrier 21 which is transversely moveable on slideways 22 on carrier 23, which is mounted on slideways 23a for longitudinal movement. Carrier 23 is positioned by push rod 24 and carrier 21 is positioned by push rod 25, which engages with one arm of a bell-crank lever 26, the other arm of which engages with a channel 27 on carrier 21 lying parallel to the direction of motion of carrier 23. Thus longitudinal movement of push rod 25 results in transverse movement of carrier 21. Arm 20 is held rigidly parallel to the axis of the chuck in normal operation, (but can be raised to allow a finished bellows to be removed). Thus push rod 24 controls the longitudinal position of tool 19 and push rod 25 its lateral position.

A conventional part-off tool 28 is situated adjacent to steady 14, being held in a carrier 29. 28 is normally held clear of the work piece, but may be brought into contact with it by means of a push rod 30, acting through a suitable cam and linkage mechanism indicated at 31.

The push rods 18, 24, 25, 30 are controlled by four cams housed inside a cam box 32, and are spring-loaded outwards, i. e. towards the chuck, by coil springs 33. Referring to Figure 6, cam A controls push rod 24, cam B controls push rod 25, cam C controls push rod 18 and cam N controls push rod 30.

Cams A, B, C are mounted (together with further cams D, E, F, whose function will be described later) upon a shaft 34, the cams being keyed to the shaft and located by spacing sleeves 36 and collars 37, the whole cam assemblage being retained in position between a shoulder 38 formed towards one end of shaft 34 and lock nuts 39 carried upon a threaded portion 40 of shaft 34 towards its other end. Shaft 34 is mounted in ball bearings 41, and is rotatable by means of a gear wheel 42, keyed to one end, which meshes with a further gear wheel 43 carried upon a shaft 44 mounted in ball bearings 45. Shaft 44 is provided with a squared end, indicated at 148, which may be engaged by a suitable key, thus enabling the shaft to be rotated manually if necessary. Towards the end remote from gear wheel 43 shaft 44 is formed with a splined portion 46 which carries an internally splined sleeve 47 having limited movement in the direction of the axis of shaft 44. Sleeve 47 is formed externally towards one end with a frusto-conical braking surface 48, capable of mating with a corresponding surface 49 formed on a member 50 secured to the wall of cam box 32 and towards the other end with dogs 51 capable of engaging with corresponding dogs 52 formed at one end of a further sleeve 53 rotatably mounted on shaft 44. Sleeve 47 is formed with an external circumferential groove 54 (Figure 5) which is engaged by an actuating fork 55 positioned by a double-acting compressed air piston and cylinder Q. Thus when one inlet port of cylinder Q is supplied with compressed air shaft 44 and sleeve 53 are clutched together and when the other inlet port is so supplied shaft 44 is braked. Sleeve 53 carries a worm wheel 57 engaged by a worm 58 (Figure 6) carried upon a vertical shaft 59 driven by an electric motor 60 (Figure 1) mounted on the top of the cam box 32. Sleeve 53 is located against axial movement relative to shaft 44, and is formed, at the end away from dogs 52, with dogs 61 capable of engaging with dogs 62 formed on the end of a sleeve 63, also rotatably mounted upon shaft 44. A coil spring 64 engages with the end of sleeve 63 remote from dogs 62 and abuts against a ball bearing 65 so that it is not substantially constrained against rotation. Spring 64 thus tends to bring dogs 62 into engagement with dogs 61, but the dogs are normally held out of engagement by means of a pin 66 (Figure 7) which engages with a slot 67 formed in sleeve 63. Lifting of pin 66 results in engagement of dogs 61 and 62. The form of slot 67 is shown in Figure 7A. Normally pin 66 is situated at one end, 149, of the slot. Upon lifting of pin 66 dogs 62 engage dogs 61, so that sleeve 63 is rotated. During rotation of sleeve 63 pin 66 may drop into portion 150 of the slot, and such rotation brings pin 66 into contact with ramp-like portion 151, so that further rotation produces withdrawal of dogs 62 and cessation of rotation of sleeve 63 when pin 66 reaches end 149. The final stages of withdrawal are assisted by the action of cam N and its follower 83N (see below).

Pin 66 is carried upon an arm 68, pivoted at one end to the cam box housing and loaded towards sleeve 63 by a spring plunger 69 (Figure 7). Arm 68 is formed with a longitudinally-extending slot, in which is disposed a plate 70, this being loaded away from the pivotal point by a helical spring 71. Arm 68 is formed with two holes 72, 73, and plate 70 is formed with a hole 74 corresponding to hole 72. Hole 72 is almost completely masked by plate 70 when spring 71 is in its extended condition, and hole 73 is also masked by plate 70. A pin 76 mounted on the housing wall is formed with a tapered end portion 77 extending into hole 72 and lying adjacent one edge of hole 74 when pin 66 lies in slot 67. The plunger 78 of a compressed air piston and cylinder P extends into hole 73 on the opposite side of arm 68 from pin 76, engaging with the part of plate 70 masking hole 73 when spring 71 is in its extended condition. Thus when compressed air is admitted to cylinder P plunger 78 engages with the portion of plate 70 masking hole 73, thus rotating arm 68 counter-clockwise as shown in the drawing. Thereupon pin 66 is lifted out of slot 67, sleeve 63 moves under the influence of spring 64 to bring dogs 62 into engagement with dogs 61 and sleeve 63 is thus rotated. However, the tapered end portion 77 of pin 76 engages with hole 74, forcing plate 70 upwards (as seen in Figure 7) and unmasking hole 73. Arm 68 then moves back under the influence of plunger 69, pin 66 being held in contact with the periphery of sleeve 63. As sleeve 63 rotates pin 66 drops into slot 67 and, because of the cranked form of the slot, continued rotation of sleeve 63 results in withdrawal of dogs 62 and cessation of rotation after one revolution as explained above. Thus energisation of the cylinder P results in a single revolution of sleeve 63, and before a further revolution can be made cylinder P must be de-energised and subsequently re-energised.

In addition to cam N (mentioned above) bolted to sleeve 63, a further cam O is also carried upon sleeve 63, which engages with the operating member of, and momentarily opens, an electric switch 82 towards the end of a revolution of sleeve 63.

The contours of cams A, B, C, and N and various followers etc. associated with them are shown in Figures 8 to 11 respectively. Cam A has, in the particular embodiment shown and described, five lobes. A roller follower 83 carried at one end of a swinging lever 84 engages with the periphery of cam A. Lever 84 is pivoted at an intermediate point 85 to a displaceable member 86 and formed on the portion away from follower 83 with an elongated slot 87. Slot 87 is engaged by a pivot 88 (which constitutes the fulcrum for the swinging lever 84), carried at one end of an arm 89. The other end of arm 89 is carried in a vertical slideway 90. The position of arm 89 is slideway 90 may be adjusted by means of a threaded rod 91, journalled in a bearing 92 adjacent to one end of slideway 90 and extending parallel to that slideway. Rod 91 engages with a suitably threaded mating hole 93 formed in arm 89 and is provided with a knurled knob 94 at one end which is accessible from underneath the back of cam box 32 (see Figure 5). Arm 89 may be locked in a set position by means of a clamping screw 95, the position being indicated by means of a pointer 96 (Figure 8, similar to pointers 96N and 96C in Figure 5). Displaceable member 86 is attached at one end to one end of push-rod 24, which has a sliding fit in a bush 97 rigidly located with respect to cam box 32, and the other end is in the form of a rod 98 extending parallel to push rod 24 through a bush 99, adjacent to the top of slideway 90.

It will thus be seen that rotation of cam A results in oscillation of push-rod 24 back and forth; and that by adjustment of the position of arm 89 the amplitude of movement of push rod 24 may be adjusted continuously over a substantial range.

Cams B, C and N have associated with them followers etc. precisely equivalent to those associated with cam A, and components associated with these cams are indicated by the same reference numeral as the corresponding components associated with cam A followed by a letter denoting the associated cam. The direction of rotation of each cam in normal operation is indicated by the arrow adjacent to its periphery.

Cams A, B, and C are of such forms that they produce, during one complete rotation of shaft 34, such longitudinal and transverse movements of the internal tool 19 and such longitudinal movements of the external tool 15 as are required to form one convolution of a bellows (as will be described below with reference to Figure 16), and cam N is such that it produces, in one complete rotation of sleeve 63, such motion of the part-off tool as is required to sever a completed bellows from the tubular blank; and, as mentioned above, additionally assists the complete disengagement of dogs 61, 62. By adjustment of arms 89 provision may be made for the production of bellows of a large range of sizes and configurations.

Cams D, E and F (mounted on shaft 34 as mentioned earlier) operate respectively valves G, J and L immediately after the point in a complete revolution of shaft 34 corresponding to the completion of a convolution of the bellows.

Valve G controls the flow of air to cylinder H (controlling the transverse motion of the external tool 19).

Valve J controls the flow of air to cylinder K (controlling movement of the chuck head).

Valve L controls the flow of air to a cylinder M mounted immediately behind the portion of cam box 32 visible in Figure 1 (see Figure 12) whose piston rod 101 engages one end of an arm 102 (Figures 1 and 13), pivoted about the axis of a counting device indicated generally at 103. Arm 102 carries, pivotally attached thereto, a spring loaded pawl 104 normally engaging with the teeth of ratchet wheel 105. A pin indicated at 104a, extends out of the plane of pawl 104. Ratchet wheel 105 is carried by an arbor 107 mounted in a ball bearing. Arbor 107 is loaded by a helical spring 109 in a sense to hold the teeth of ratchet 105 in engagement with pawl 104. A further spring-loaded pawl 106, pivotally attached to the wall of the housing of counter 103, also engages the teeth of ratchet 105. A further arm 108 pivoted about the axis of arbor 107 carries a pin, indicated at 108a, capable of engaging with, and releasing, pawl 106, and is formed at 108b with a cam surface capable of engaging with pin 104a and releasing pawl 104. Arm 108 is engaged by the piston rod 111 of a cylinder (cylinder R). Thus anti-lockwise rotation of arm 108 consequent upon the supply of air to cylinder R results in the release of both pawls 104 and 106 and, under the action of spring 109 the return of arbor 107 and the components attached thereto to a datum position, defined by an arm 110 attached to the arbor and a fixed stop 110a. Cylinder M arm 102 etc. are such that each time air is supplied to cylinder M (and arm 102 thus rotated clockwise through a limited arc) one tooth of ratchet 105 is fed past pawl 106. Arbor 107 carries a disc 113 provided with holes adjacent its periphery corresponding to the teeth of ratchet 105. Disc 113 is surrounded by an annular scale 114 carrying numbers corresponding to the ratchet teeth. A combined indicator and valve release member 115 is positioned in one of the holes in disc 113. Member 115 is carried upon an arm 118 rotatable about arbor 107 and is retained in a selected position by means of a spring loaded plunger 119. When member 115 reaches the zero position of scale 114 it engages with a tappet 116 which in its turn engages with the operating member of a valve S. Opening of valve S results in the supply of air to cylinder R and thus to the release of ratchet 105 and the return of arbor 107 to its datum position. It will be seen that levers 102, 108 while lying generally outside the wall of cam box 32 are bent towards their ends to pass through arcuate slots 120, 121 formed in the wall of the cam box to engage with the appropriate piston rods of cylinders M and K, which are inside the box. Tappet 116 constitutes a trip member and, as will be seen below, displacement thereof results in operation of the part-off tool 28 to sever a completed bellows from the blank.

The cylinders referred to earlier, as well as various cams and valves etc. associated therewith, previously mentioned, and certain other components and the connections between them are shown schematically in Figure 15.

A source of compressed air indicated at 122 is connected to the inlets of valves G, J, L and S previously mentioned (which as also previously mentioned control the flow of air to cylinders H, K, M, and R) and also to the inlet 128 of a change-over valve Y, and two pushbutton controlled valves 123 and 124. Valve Y is provided with first and second outlet ports indicated at 125 and 126 and exhaust ports indicated at 127. Valve Y is positioned by the admission of compressed air to one or other of control ports 129 and 130. When air is admitted to port 129 connection is established between ports 128 and 125 and between port 126 and one port 127 (as indicated by broken lines) and when air is admitted to port 130 connection is established between ports 128 and 126 and between port 125 and the other port 127. Port 129 is connected to the outlet port of valve 123 and port 130 is connected to the outlet port of valve S.

Port 125 is connected to one port, 131, of a further change-over valve X and port 126 is connected to the inlet of cylinder P and also to a further port, 132, of valve X. Valve X is also provided with an exhaust port 133 and outlet ports 134, 135, 136. It is controlled by the admission of compressed air to one or other of control ports 137 and 138. When air is admitted to port 137 connection is established between ports 131 and 134 and between 132 and 136 (as indicated by broken lines) and when air is admitted to port 138 connection is established between ports 131 and 135 and between 133 and 134, and ports 132 and 136 are closed. Port 134 is connected to one inlet port of cylinder Q. Ports 135 and 136 are connected together to the other inlet port of cylinder Q. Control port 137 is connected to the outlet port of valve 123 and control port 138 to the outlet port of valve 124. It should be mentioned that when the button associated with one of valves 123, 124 is pressed, the outlet associated with that valve is connected to the inlet and when the button is released the outlet is connected to one of the exhaust ports 139, 140 associated with those valves.

Switch 82 is connected in the holding-on circuit of the contactor for the chuck motor, so that its momentary opening by cam O results in the stoppage of the chuck motor.

The manner in which the various components co-operate will most readily be appreciated by considering the manufacture of a bellows by means of the machine. The relation between the movements of certain of the tools will be best appreciated from the developed views of the peripheries of cams A, B, C, D, E F shown in Figure 16. The stages in manufacture are as follows:

(1) Chuck motor stationary, motor 60 running, braking surfaces 48 and 49 in contact (braking shaft 34) dogs 51 and 52 and dogs 61 and 62 disengaged, all cams stationary in zero position (cams A, B, C, N as shown in figures 8–11).
  (a) Tubular blank (whose wall is indicated at 160 in Figs. 18A to E) inserted in chuck 4, and supported by steady 14
  (b) with arm 110 in contact with stop 111, member 115 is set to indicate desired number of convolutions on scale 114
  (c) internal tool 19 in maximum backward position (i. e. towards cam box 32) (position shown in broken lines in Fig. 18(a))
  (d) periphery of 19 just clear of inside of wall 160 of blank
  (e) external tool 15 at minimum distance from cam box 32, the part of tube between tool and steady being sufficient for the formation of one convolution
  (f) external tool 15 positioned away from wall of tube (position shown in broken lines in Fig. 18(a))
(2) chuck motor started
  (a) rotating blank about axis of chuck and steady
(3) Button for valve 123 ("start" button) pressed:
  (a) bringing valves X and Y to the positions shown in Figure 15 thus
  (b) admitting air to one port of cylinder Q which
  (c) disengages braking surfaces 48 and 49
  (d) engages dogs 51, 52, so
  (e) causing shaft 34 and cams A, B, C, D, E, F, to rotate
(4) valve G closed, by cam D, energizing cylinder H to position external tool 15 adjacent the wall of the tube (position shown in full lines in Figure 18(a)).
(5) (a) internal tool 19 moves forwards (away from box 32) (cam A) (position shown in full lines in Fig. 18(a))
  (b) internal tool 19 moves outwards (cam B) for a fraction of the eventual depth of a convolution thus expanding the tube over the region with which it is in contact and simultaneously
  (c) external tool 15 moves towards steady 14 cam C to take account of decreasing length due to the increase of diameter produced by the action of internal tool 19, tools 15 and 19 attaining the position, and the tube wall being expanded to a form as shown in Figure 18(b).
  (d) internal tool 19 moves backwards at a constant distance from tube axis, increasing diameter of tube between steady 14 and external tool 15, which remains stationary, until the condition shown in Figure 18(c) is attained a convolution thus being partially formed.
  (e) steps (a) (b) (c) (d) repeated, to make five repetitions in all to form the convolution to its full depth, the increase in diameter in the final sequence being preferably comparatively small for finishing purposes, and there being no longitudinal movement of tool 19 after its last outward lateral movement it thus being seen that the finished length of the convolution is substantially equal to the thickness of the internal tool.

It will be appreciated that these operations result in the production of a convolution in the blank by a spinning process—Internal tool 19 of course rotates freely on arm 20 during spinning, there being a rolling contact between its periphery and the internal wall of the blank.

(6) When the convolution has been completed internal tool 19 moves laterally to clear tubular blank (Figure 18D), and cams A, B, C are approaching the end of a complete revolution from the zero position as cams D, E, F operate their associated valves G, J, L.
  (a) valve G is opened to de-energise cylinder H, allowing the external tool 15 to be retracted through a sufficient distance to clear the formed convolution.
  (d) Valve J is opened to energise cylinder K thus feeding the chuck head towards the cam box through a distance equal to the length of tube required for a further convolution, and immediately afterwards closes
  (c) Valve L is opened to energise cylinder M, thus moving member 115 one division along scale 114, and immediately afterwards closes
(7), (5) and (6) are repeated until, at the conclusion of the formation of the set number of convolutions, member 115 strikes tappet 116, operating valve S
(8) Operation of valve S
  (a) energises cylinder R, so allowing the arbor 107 of device 103 to return to its zero position
  (b) moves valve Y to its second position (that not shown in Figure 15)
(9) Movement of valve Y
  (a) connects port of cylinder Q previously under pressure to exhaust, and connects port previously connected to exhaust to pressure source 122. This engages braking surfaces 48 and 49 and disengages 51 and 52, thus braking shaft 34 in such a position that tools 15 and 19 are disengaged from the tube
  (b) energises cylinder P, lifting arm 68 and disengaging pin 66 form groove 67 thus allowing dogs 61 and 62 to come into engagement and causing sleeve 63 to make one revolution.
(10) During the revolution of sleeve 63
  (a) part-off tool 28 is fed forward (i. e. in a direction transverse to the axis of the blank), and severs the finished bellows under the control of cam N (Figure 18E).
  (b) towards the end of the revolution of sleeve 63 cam O operates switch 82, momentarily opening the holding-on circuit of the chuck motor contactor and thus stopping the chuck motor
(11) The completed bellows is removed from arm 20
(12) A further bellows is produced by repetition of operations 1 to 11

The above sets out the normal cycle of operations.

However, it may be necessary to stop operation of the tools etc. during the process of making a bellows, for example in order to check the setting of the machine or to prevent a blank which has split in the forming process from damaging the tools. To do this, button 124 (the "Emergency Stop" button) is pressed. Air is thus applied to control port 138 of valve X, so that connection is established between 134 and 133, and 131 and 135. Dogs 51 and 52 are thus disengaged, braking surfaces 48 and 49 are engaged and rotation of shaft 34 ceases. On subsequently pressing button 123 the process resumes its normal course.

A modification to the machine is shown in Figure 17. This modification entails the removal of the springs 33 and the addition of compressed air energised pistons and cylinders 152, 153, 154 and 155, at the rear of cam box 32, the piston rods thereof being attached to rods 98 associated with cams A, B, C, and N. The advantage of this feature is that the possibility of trouble due to breakage of springs 33 under fatigue is eliminated.

We claim:
1. A machine for the manufacture of devices of the kind referred to from a tubular blank by a spinning process, comprising means to rotate the blank about its axis, cyclically-operated tool actuating means, external and internal tools adapted to engage with the blank and to be moved relatively to each other and to the blank by the said tool actuating means, the tools during each cycle of operation of the actuating means producing one convolution; in the blank during rotation thereof, a counter device operatively connected with said tool actuating means, means to actuate said counter device upon completion of each convolution, said counter device including a trip member adapted to be displaced after the completion of a predetermined number of convolutions, a part-off tool and means controlled by the trip member and actuated upon displacement thereof to operate the part-off tool, after a predetermined number of convolutions has been formed, to sever the device from the tubular blank.

2. A machine as claimed in claim 1 wherein the tools comprise a fixed external tool adapted to locate the blank, a moveable external tool adapted to be moved transversely and longitudinally with respect to the axis of the blank and an internal tool adapted to be moved laterally and longitudinally with respect to the axis of the blank.

3. A machine as claimed in claim 2 comprising also first, second, third and fourth cams mounted upon a common shaft, said first, second, third and fourth cams being respectively adapted to control the longitudinal and lateral movements of the internal tool relative to the blank and the longitudinal and lateral movements of the moveable external tool, the said movements of said tools produced during a single rotation of said common shaft from a zero position being such as to form a single convolution in the blank, and the counter being actuated once for each revolution of said common shaft from the said zero position.

4. A machine as claimed in claim 3, wherein the counter comprises a ratchet wheel mounted upon an arbor for rotation about the axis thereof from a datum opposition, spring means adapted to return said ratchet wheel to said datum position, a first pawl normally engaging with said ratchet to prevent return thereof to said datum position, a second pawl also normally engaging with said ratchet, means to displace said second pawl a given amount, and thus also said ratchet through a given angle from its datum position, upon completion of each revolution of the common shaft from its zero position, a member locatable in any one of a plurality of locations fixed relatively to the ratchet wheel and uniformly spaced about the axis thereof, the angular spacing of said locations being equal to the given angle, said member engaging with the trip member and effecting displacement thereof after the completion of a predetermined number of convolutions dependent upon the location in which the member is located.

5. A machine according to claim 4 comprising also means actuated upon displacement of the trip member to release the first and second pawls and allow the ratchet to return to its datum position under the spring restraint.

6. A machine according to claim 3, comprising also means actuated by the trip member upon displacement thereof to inhibit motion of the external and internal tools.

7. A machine as claimed in claim 3 comprising also a driving shaft, means to rotate said driving shaft substantially continuously, means to drive the common shaft from said driving shaft, said means incorporating a first clutch, a fifth cam, means to drive said fifth cam from said driving shaft, said means incorporating a second clutch, said fifth cam being adapted to control motion of the part-off tool means actuated by the trip member of the counter actuating means to disengage said first clutch and also means to engage said second clutch upon displacement thereof, together with means to disengage said second clutch after the severance of the device from the tubular blank.

8. A machine as claimed in claim 7 wherein the second clutch has driving and driven members, the driven member is carried upon a sleeve displaceable with respect to the driving member in the direction of the common axis of the driving and driven members, and the said sleeve is formed with a slot extending part way around the periphery thereof, comprising spring means acting upon said sleeve in a direction to engage the driving and driven members, a pin spring loaded towards the axis of the driving and driven members, said pin normally lying at one end of the said slot and thus maintaining the driven member out of engagement with the driving member, means controlled by said trip member of the counter upon displacement thereof to lift the said pin momentarily out of the said slot and the said slot having a configuration such that during rotation of the sleeve upon engagement of the driven and driving members the pin re-enters the slot and interaction between slot and pin withdraws the said driven member from engagement with the driving member.

9. A machine according to claim 8 wherein the pin is carried upon a spring-loaded pivoted lever, the said lever being formed with a hole extending therethrough in a direction parallel to that of the pin, said lever also carrying a plate moveable against a spring restraint in a direction at right angles to that of the pin, said plate being normally disposed in a position to mask the hole but being displaceable against the spring restraint to unmask the hole, together with a plunger adapted to engage with said plate and thus lift the pin out of the said slot upon displacement of the trip member of the counter, and means to displace the plate and unmask the hole after the pin is lifted clear of the end of the slot, so that the pin is thereafter free to enter the slot irrespective of the position of the plunger.

10. A machine as claimed in claim 4 comprising a sixth cam mounted upon the common shaft, and means controlled by said sixth cam to displace the second pawl through the given amount upon completion of a complete rotation of the common shaft from zero position.

11. A machine as claimed in claim 10 wherein the means to rotate the blank about its axis comprise a chuck adapted to grip and support one end of the said blank, and the fixed external tool is disposed between the moveable external and internal tools and the chuck, comprising also feed means to feed the said chuck towards the external tool by successive equal predetermined amounts and a seventh cam mounted on the common shaft to control the said feed means, the chuck being fed towards the tool by a predetermined amount upon completion of a complete rotation of the common shaft from its zero position.

12. A machine as claimed in claim 3 wherein the fixed external tool has a contour adapted to surround and engage with the periphery of the blank, the moveable external tool has a contour in the form of an arc of a circle corresponding to the external diameter of the blank, and the internal tool comprises a roller rotatably mounted about an axis parallel to that of the blank.

13. A machine as claimed in claim 3, wherein the first, second and third cams respectively control their associated tools through follower and linkage mechanism, the said mechanisms incorporating spring loading means to maintain contact between each follower and its associated cam.

14. A machine as claimed in claim 3, wherein the first, second and third cams respectively control their associated tools through follower and linkage mechanisms, the said mechanisms incorporating fluid pressure loading means to maintain contact between each follower and its associated cam.

15. In combination in a device for producing hollow flexible walled structures spun from a tubular blank, comprising means to rotate a tubular blank about its longitudinal axis, cyclically-operated tool actuating means, external and internal tool means mounted for actuation by said actuating means to engage a tubular blank, said external and internal tool means being movable relative to each other, at least one of said tool means being movable with respect to a tubular blank to be treated to form convolutions therein, one at a time, a convolution counting means operatively connected with said tool actuating means a part-off tool, means controlled by said counting means and actuated thereby to operate said part-off tool upon the counting of a predetermined number of convolutions to sever a treated tube portion from said tubular blank.

16. The combination set forth in claim 15, means to operate said counting means upon the completion of each convolution, said external tool having a fixed position and constructed to position a tubular blank to be acted upon.

17. The combination set forth in claim 15, said means to rotate the tubular blank comprising a chuck constructed to grip and support one end of said blank and feed means to feed said chuck toward said external tool means by successive equal predetermined amounts, said external and internal tool means comprising a fixed external tool constructed to locate the blank, a movable external tool constructed to be moved transversely and longitudinally with respect to the axis of the blank and an internal tool constructed to be moved laterally and longitudinally with respect to the axis of the blank, said convolution counter means comprising a ratchet wheel mounted for rotation upon an arbor from a datum position, means to return said ratchet wheel to said datum position, and a trip member adapted to be displaced after the completion of a predetermined number of convolutions, said part-off tool comprising an edged member held in a carrier normally clear of the blank and the structure being formed therefrom and means to bring the edged member into cutting contact with the material of said blank.

References Cited in the file of this patent

UNITED STATES PATENTS

| | | |
|---|---|---|
| 918,469 | Pogany | Apr. 13, 1909 |
| 1,128,462 | Kustner | Feb. 16, 1915 |
| 1,580,505 | Lee | Apr. 13, 1926 |
| 1,670,499 | Ekstedt | May 22, 1928 |
| 1,702,475 | Jahnig | Feb. 19, 1929 |
| 1,882,182 | Dreyer | Oct. 11, 1932 |
| 2,094,024 | Reichert | Sept. 28, 1937 |
| 2,581,787 | Dreyer | Jan. 8, 1952 |